United States Patent
Singh et al.

(10) Patent No.: US 11,792,472 B2
(45) Date of Patent: Oct. 17, 2023

(54) SCHEDULE-BASED UNINTERRUPTED BUFFERING AND STREAMING

(71) Applicant: Wayne Fueling Systems LLC, Austin, TX (US)

(72) Inventors: Kalpit Singh, Jaipur (IN); Hob Hairston, Cedar Park, TX (US); Henry Fieglein, Leander, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 394 days.

(21) Appl. No.: 16/574,668

(22) Filed: Sep. 18, 2019

(65) Prior Publication Data

US 2021/0084365 A1 Mar. 18, 2021

(51) Int. Cl.
| | |
|---|---|
| H04N 21/44 | (2011.01) |
| H04L 29/06 | (2006.01) |
| H04N 21/458 | (2011.01) |
| H04N 21/845 | (2011.01) |
| H04N 21/433 | (2011.01) |
| G06F 15/16 | (2006.01) |
| H04L 15/16 | (2006.01) |
| H04L 65/60 | (2022.01) |

(52) U.S. Cl.
CPC ....... *H04N 21/44004* (2013.01); *H04L 65/60* (2013.01); *H04N 21/4334* (2013.01); *H04N 21/458* (2013.01); *H04N 21/8451* (2013.01)

(58) Field of Classification Search
CPC .......... H04N 21/44004; H04N 21/458; H04N 21/8451; H04N 21/4334; H04L 65/60
USPC ....................................................... 709/217
See application file for complete search history.

(56) References Cited

U.S. PATENT DOCUMENTS

| | | | | |
|---|---|---|---|---|
| 6,389,473 B1 * | 5/2002 | Carmel | ................... | H04L 65/80 |
| | | | | 709/231 |
| 7,496,280 B2 * | 2/2009 | Sugimura | ............ | G11B 27/034 |
| | | | | 386/239 |
| 9,158,794 B2 * | 10/2015 | Higgins | .............. | G06F 16/9535 |
| 9,197,688 B2 * | 11/2015 | McGowan | ............. | G11B 27/10 |
| 9,319,696 B2 * | 4/2016 | Wu | ................... | H04N 21/23424 |
| 9,584,874 B1 * | 2/2017 | Farías | .............. | H04N 21/44213 |

(Continued)

FOREIGN PATENT DOCUMENTS

| | | | | | |
|---|---|---|---|---|---|
| CA | | 2474040 C | * | 2/2010 | ........... G11B 27/034 |
| WO | WO-2007046248 A1 | * | 4/2007 | ............. G11B 20/12 |
| WO | WO-2018231307 A1 | * | 12/2018 | ............. H04L 67/10 |

*Primary Examiner* — David R Lazaro
*Assistant Examiner* — Berhanu Shitayewoldetadik
(74) *Attorney, Agent, or Firm* — MINTZ LEVIN COHN FERRIS GLOVSKY AND POPEO, PC

(57) ABSTRACT

Methods and systems are provided for schedule-based uninterrupted buffering and streaming. In an embodiment, at least one first media file can be received by a streaming server. The streaming server can create a first media file playlist including the at least one first media file. A schedule defining a first desired output time at which a client is to output the first media file playlist can be received by the streaming server. A schedule-based streaming buffer can be generated by the streaming server. The schedule-based streaming buffer can store the first media file playlist prior to the first desired output time. The schedule-based streaming buffer can be provided to the client by the streaming server such that the client can output the first media file playlist at the first desired output time.

20 Claims, 6 Drawing Sheets

(56) References Cited

U.S. PATENT DOCUMENTS

| | | | |
|---|---|---|---|
| 9,736,200 B2* | 8/2017 | Addy | H04L 65/61 |
| 9,876,833 B2* | 1/2018 | Johnson | H04Q 65/60 |
| 10,217,488 B1* | 2/2019 | Huang | G06T 7/292 |
| 10,754,503 B2* | 8/2020 | Ho | H04L 67/22 |
| 10,976,988 B2* | 4/2021 | Oskarsson | G06F 16/639 |
| 2002/0097750 A1* | 7/2002 | Gunaseelan | H04N 21/23805 375/E7.02 |
| 2003/0236843 A1* | 12/2003 | Weber | H04N 7/17318 709/206 |
| 2004/0154041 A1* | 8/2004 | Zhang | H04N 21/23406 725/74 |
| 2006/0126713 A1* | 6/2006 | Chou | H04N 21/2662 375/225 |
| 2006/0143678 A1* | 6/2006 | Chou | H04N 19/152 725/118 |
| 2006/0165166 A1* | 7/2006 | Chou | H04N 21/2402 375/E7.017 |
| 2007/0101378 A1* | 5/2007 | Jacobs | H04L 65/1101 725/115 |
| 2007/0102764 A1* | 5/2007 | Ando | H04N 21/4325 348/E5.006 |
| 2009/0240827 A1* | 9/2009 | Fernandez | G06Q 30/0277 709/231 |
| 2009/0254657 A1* | 10/2009 | Melnyk | H04L 65/65 709/224 |
| 2010/0131671 A1* | 5/2010 | Kohli | H04L 65/762 709/233 |
| 2010/0169303 A1* | 7/2010 | Biderman | H04N 21/44004 707/723 |
| 2010/0169453 A1* | 7/2010 | Biderman | H04N 21/26258 709/217 |
| 2011/0022223 A1* | 1/2011 | Johnson, Jr. | G06Q 20/20 700/232 |
| 2011/0235988 A1* | 9/2011 | Leichsenring | H04N 21/42646 386/230 |
| 2011/0246622 A1* | 10/2011 | Pantos | H04L 67/02 709/219 |
| 2011/0246623 A1* | 10/2011 | Pantos | H04L 65/756 709/219 |
| 2011/0252118 A1* | 10/2011 | Pantos | G06F 3/0484 709/219 |
| 2011/0307623 A1* | 12/2011 | George | G06F 9/451 709/231 |
| 2012/0054664 A1* | 3/2012 | Dougall | H04N 21/6582 715/772 |
| 2012/0110141 A1* | 5/2012 | Biderman | H04N 21/8456 709/219 |
| 2012/0254456 A1* | 10/2012 | Visharam | H04L 65/762 709/231 |
| 2013/0159388 A1* | 6/2013 | Forsman | H04L 65/60 709/203 |
| 2013/0166770 A1* | 6/2013 | Yie | H04L 65/762 709/231 |
| 2013/0173760 A1* | 7/2013 | Yie | H04N 21/8456 709/219 |
| 2015/0007244 A1* | 1/2015 | Colby | H04N 5/782 725/116 |
| 2015/0146778 A1* | 5/2015 | De Cicco | H04N 19/115 375/240.07 |
| 2015/0281752 A1* | 10/2015 | Van Veldhuisen | H04N 21/8456 725/116 |
| 2017/0366591 A1* | 12/2017 | Thomas | H04N 21/8456 |
| 2017/0374320 A1* | 12/2017 | May, Jr. | H04N 21/654 |
| 2018/0131738 A1* | 5/2018 | Johnson | H04N 21/8586 |
| 2018/0376223 A1* | 12/2018 | Chen | H04N 21/234 |
| 2019/0068665 A1* | 2/2019 | Kieft | H04L 67/75 |
| 2019/0075353 A1* | 3/2019 | Parampath | H04N 21/4622 |
| 2019/0132630 A1* | 5/2019 | Loheide | H04N 21/23439 |
| 2019/0235917 A1* | 8/2019 | Koneru | G06F 9/4843 |
| 2020/0128293 A1* | 4/2020 | Mittal | H04N 21/845 |
| 2020/0194033 A1* | 6/2020 | Huang | H04N 5/772 |
| 2020/0236416 A1* | 7/2020 | Colby | H04N 21/458 |
| 2020/0314161 A1* | 10/2020 | Pantos | H04L 67/02 |

* cited by examiner

SCHEDULE-BASED UNINTERRUPTED BUFFERING AND STREAMING

FIELD

The subject matter described herein relates to schedule-based uninterrupted buffering and streaming.

BACKGROUND

A user can create a media file playlist by defining a sequential output order for a collection of media files. The ordered collection of media files, or media file playlist, can be scheduled for output at a client. For example, a media file playlist can be scheduled for output during a specific time period, such as a specific minute, hour, and/or the like, such that each media file can be output at the client during the scheduled time period. Each media file in the collection of media files can be downloaded locally to a storage on the outputting client. The collection of media files stored locally can be output in the order specified by the media file playlist and at the time specified by the schedule.

In a typical media file scheduling system, a media file playlist can be created and scheduled for output during a specific time period. For example, media file playlist A can be scheduled for a first time period, media file playlist B can be scheduled for a second time period, and so forth. The media files that comprise the media file playlist can be downloaded locally to the client performing the output. Upon arrival of a time period specified by the schedule, the media files can be output one after another in the order specified by the media file playlist(s) and at the time specified in the schedule.

However, typical media file scheduling systems have several drawbacks. For example, clients must maintain a local copy of the schedule settings, the configuration files, and the media files comprising the media file playlists. Changes to the schedule can be reflected only when the media files, schedule, and configuration files are re-downloaded to the client. But maintaining updated local copies of the media files, schedule, and configuration files can be cumbersome for clients with limited memory and/or storage capacity. For example, a client may run out of storage before completing a media file download and the media file may be corrupted and unsuitable for output. And synchronous streaming across multiple clients can be burdensome, especially when the clients support different file formats and codecs. In addition, dynamic and/or adoptive encoding of the media files based on network bandwidth (e.g., encoding the media file in a bitrate proportional to the bandwidth of the network) can be unattainable. Accordingly, it can be desirable to output media files at the client in an order specified by the media file playlist and at a time specified by the schedule without maintaining local copies of the media files, schedule, and configuration files.

SUMMARY

Methods and systems are provided for schedule-based uninterrupted buffering and streaming. In an embodiment, at least one first media file can be received by a streaming server. The streaming server can create a first media file playlist including the at least one first media file. A schedule defining a first desired output time at which a client is to output the first media file playlist can be received by the streaming server. A schedule-based streaming buffer can be generated by the streaming server. The schedule-based streaming buffer can store the first media file playlist prior to the first desired output time. The schedule-based streaming buffer can be provided to the client by the streaming server such that the client can output the first media file playlist at the first desired output time.

One or more of the following features can be included in any feasible combination. The streaming server can receive at least one second media file. The streaming server can create a second media file playlist including the at least one second media file. The streaming server can insert the second media file playlist into a location of the schedule-based streaming buffer following the first media file playlist prior to a second desired output time at which the client is to output the second playlist subsequent to the first desired output time such that the client outputs the second media file playlist at the second desired output time. The schedule can define the first desired output time and the second desired output time. The schedule-based streaming buffer can include an allocated data storage space. The allocated data storage space can include the added first media file playlist encoded in a first format. The schedule-based streaming buffer can be created in response to an occurrence of the first desired output time.

Adding the first media file playlist to the schedule-based streaming buffer can include encoding the first media file playlist into a first format. The encoding the first media file playlist into the first format can include determining a first bitrate based on a bandwidth of a network connection to the client. The encoding the first media file playlist into the first media file playlist into the first format can include determining a first codec based on a collection of playback formats available to the client. Encoding the first media file playlist into the first format can include using the first bit rate and the first codec.

The first codec can include H.264 advanced video coding, H.265 high efficiency video coding, VP8, VP9, AOmedia video 1, MPEG-2 audio layer III, advanced audio coding, dolby digital audio codec 3. The client can include a fuel dispenser. The schedule can be defined by a user of the streaming server. The first media file playlist can be defined by a user of the streaming server. The media file playlist can include a collection of media files including the first media file. The schedule can includes a predetermined start time and a predetermined end time for each media file in the collection of media files.

In an embodiment, streaming content can be received by a client. The streaming content can be stored in a schedule-based streaming buffer generated by a streaming server prior to a first desired output time at which the client is to output a first media file playlist. The streaming content can include at least the first media file playlist that includes at least one first media file. The first desired output time can be defined by a schedule received at the streaming server. The first media file playlist can be output at the client at the first desired output time.

One or more of the following features can be included in any feasible combination. For example, the streaming content can further include at least a second media file playlist including at least one second media file. The second media file playlist can be inserted into a location of the schedule-based streaming buffer following the first playlist prior to a second desired output time at which the client is to output the second media file playlist subsequent to the first desired output time. The second desired output time can be defined by the schedule received at the streaming server. The second media file playlist can be output at the client at the second desired output time.

The schedule-based streaming buffer can include an allocated data storage space. The allocated data storage space can include the first media file playlist encoded in a first format. The outputting the second media file playlist can include decoding the first media file playlist from a first format into a second format. The decoding can further comprise using a first codec to decode the first media file playlist into the second format. Output of the first media file playlist decoded from the first format into the second format can be in response to an occurrence of the first desired output time. The first codec can include H.264 advanced video coding, H.265 high efficiency video coding, VP8, VP9, AOmedia video 1, MPEG-2 audio layer III, advanced audio coding, dolby digital audio codec 3. The client can include a fuel dispenser. The outputting can include one or more of playing audio from an audio output and playing video from a video output.

In an embodiment, a streaming server can be configured to receive at least one first media file. The streaming server can be further configured to create a first media file playlist. The first media file playlist can include the at least one first media file. The server can be further configured to receive a schedule defining a first desired output time at which a client is to output the first media file playlist. The server can be further configured to generate a schedule-based streaming buffer that stores the first media file playlist prior to the first desired output time. The server can be further configured to provide the schedule-based streaming buffer to the client such that the client outputs the first media file playlist at the first desired output time. The client can be configured to receive streaming content stored in the schedule-based streaming buffer prior to the first desired output time. The streaming content can include at least the first media file playlist that includes the at least one media file. The client can be further configured to output the first media file playlist at the first desired output time.

One or more of the following features can be combined in any feasible combination. The streaming server can be further configured to receive at least one second media file. The streaming server can be further configured to create a second media file playlist. The second media file playlist can include the at least one second media file. The streaming server can be further configured to insert the second media file playlist into a location of the schedule-based streaming buffer following the first media file playlist prior to a second desired output time at which the client is to output the second playlist subsequent to the first desired output time such that the client outputs the second media file playlist at the second desired output time. The schedule can define the first desired output time and the second desired output time. The streaming content can further include at least the second media file playlist that includes the at least one second media file. The client can be further configured to output the second media file playlist at the second desired output time.

The streaming server can be further configured to determine a first bit rate based on a bandwidth of a network connection to the client. The streaming server can be further configured to determine a first codec based on a collection of playback formats available to the client. The first media file playlist can be encoded into the first format using the first bit rate and the first codec. The client can be further configured to decode the encoded first media file playlist into a second format using the first codec. The schedule-based streaming buffer can include an allocated data storage space within the client. The allocated data storage space can include the received portion of the first media file playlist encoded in the first format. The schedule-based streaming buffer can be created in response to an occurrence of the first desired output time. Playback of the portion of the first media file playlist decoded from the first format into the second format can occur in response to the occurrence of the first desired output time. The client can include a fuel dispenser. The client can further include one or more of an audio output device and a video output device. The audio output device can be configured to output audio included in the first media file playlist. The video output device can be configured to output video included in the first media file playlist.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended

DETAILED DESCRIPTION

Some embodiments of the current subject matter can facilitate storing media file playlists in a schedule-based streaming buffer prior to a desired output time of the media file playlists at a client. The media file playlist can be retrieved by the client and output at a desired output time specified by the schedule. As such, the output of media files can be dynamically controlled by the user, less client storage space can be used, and storage costs can be saved. Accordingly, an improved media file scheduling system can be achieved.

Figure 1:
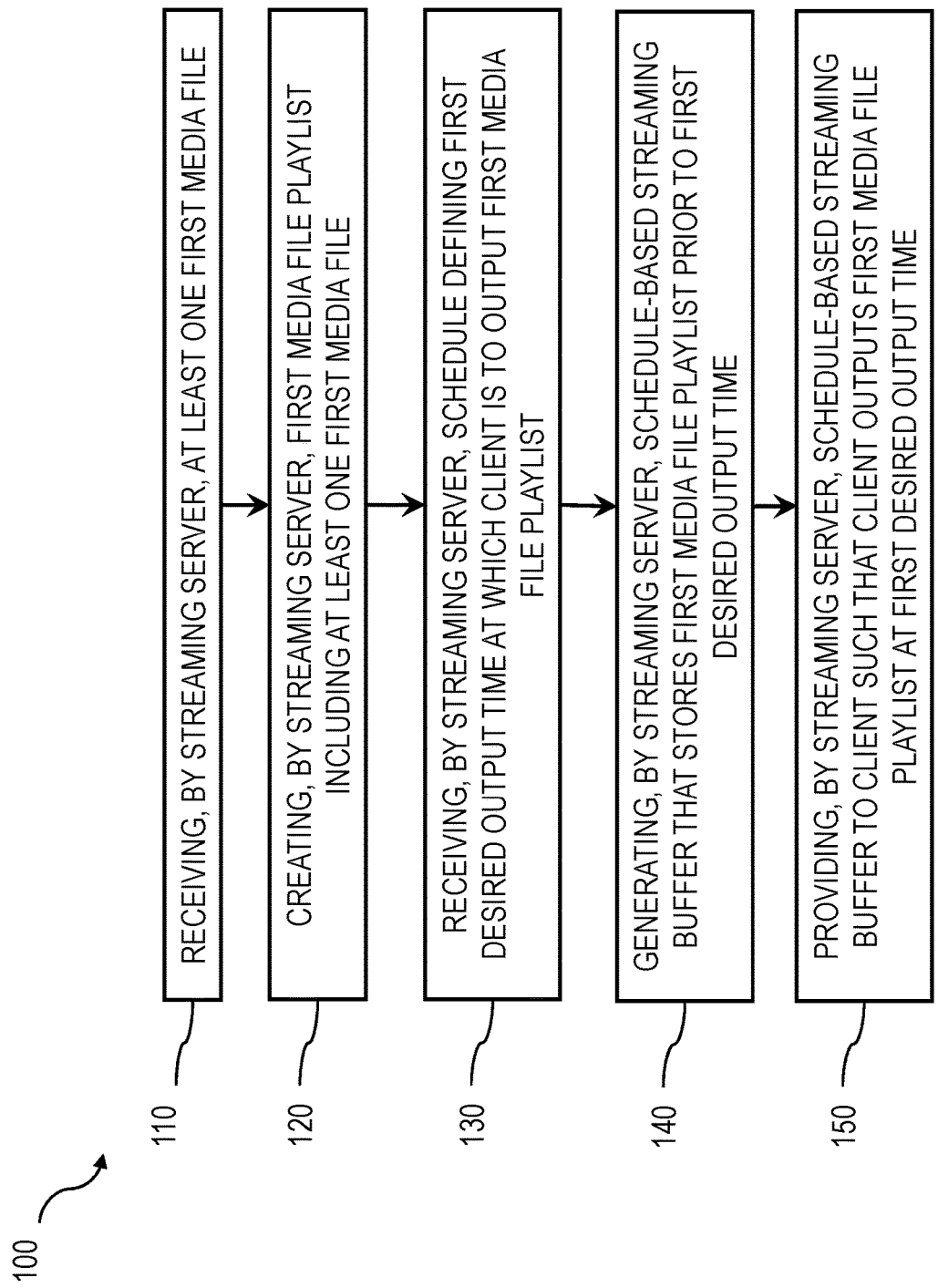
FIG. 1 is a process flow diagram illustrating an exemplary process of schedule-based uninterrupted buffering and streaming.

FIG. 1 is a process flow diagram illustrating an exemplary process 100 of schedule-based uninterrupted buffering and streaming of a media file playlist of media files. By storing the media file playlist in a schedule-based streaming buffer generated prior to a desired output time defined by a schedule, media file playlist output can be achieved without maintaining local copies of the media files, schedule, and configuration files at the client. Thus, client storage limitations can be alleviated, different media formats and codecs can be supported, and synchronous adoptive and/or dynamic bitrate streaming of scheduled media file playlists can be achieved.

At 110, a streaming server can receive at least one first media file. The first media file can be uploaded to the streaming server by an operator operating an operator device. The operator can upload the first media file to the streaming server using, for example, a user interface configured to receive a file system path identifying the first media file and initiate transmission of the first media file from the operator file system to the streaming server storage. The first media file can include, but is not limited to, multimedia file formats such as image file formats (e.g., JPEG, GIF, PNG, and/or the like), document file formats (e.g., portable document format, office open extensible markup language standard, open document format, and/or the like), video file formats (e.g., audio video interleave, flash video format, windows media video, apple quicktime movie, moving pictures expert group 4, and/or the like), audio file formats (e.g., waveform audio file format, free lossless audio codec, moving pictures expert group-2 audio layer III, ogg, and/or the like), and/or other file formats.

At 120, a first media file playlist can be created by the streaming server. The first media file playlist can include, for example, the at least one first media file received at 110. The creation of the first media file playlist can be initiated by the operator operating the operator device. The operator can include the first media file in the first media file playlist. As will be discussed below, the first media file playlist can be associated with a schedule.

At 130, a schedule can be received by the streaming server. The schedule can define a first desired output time at which a client is to output the first media file playlist. The schedule can be selected from, for example, a user interface configured to display time slots (e.g., intervals of time) for the first desired output time. In this example, subsequent or prior to selecting a timeslot, a media file playlist can be selected. The media file playlist can be associated with the schedule. For example, output of the media file playlist at the client can occur at the first desired output time. As another example, the user interface can be configured to receive an input characterizing a desired output time (e.g., a desired output time of 9:00 AM EST and/or the like).

At 140, a schedule-based streaming buffer can be generated by the streaming server. The schedule-based streaming buffer can be generated prior to the first desired output time indicated in the schedule. The schedule-based streaming buffer can store the first media file. For example, the schedule-based streaming buffer can include a portion of memory reserved for receiving a stream from the streaming server, a variable amount of storage capacity, for example, based on network bandwidth, media bitrate, and/or the like. As will be discussed below, the schedule-based streaming buffer can be configured to receive portions (e.g., chunks, slices, segments, and/or the like) of the at least one first media file in the first media file playlist according to the schedule and can indicate a fixed size for each portion of a media file.

At 150, the first media file playlist can be provided to the schedule-based streaming buffer by the streaming server. The first media file playlist can be provided to the schedule-based streaming buffer such that the client outputs the first media file playlist at the first desired output time. For example, the first media file playlist can be provided to the schedule-based streaming buffer by transmitting the first media file playlist over various transport protocols, such as the user datagram protocol, transmission control protocol, and/or the like. The transmission can occur over a network (e.g. the Internet, a wireless wide area network, a local area network, a wide area network, a wired network, a cellular network, a telecommunications network, and/or the like).

In some embodiments, the streaming server can receive at least one second media file, at least one third media file, and/or the like. A second media file playlist can be created by the streaming server. For example, the second media file playlist can include at least one second media file received by the streaming server. For example, the schedule received at 130 can define a second desired output time for the second media file playlist. The second desired output time can be subsequent to the first desired output time such that the client outputs the second media file playlist at the second desired output time. The streaming server can insert the second media file playlist into a location of the schedule-based streaming buffer that follows the first media file playlist prior to the second desired output time. For example, the second desired output time can be temporally subsequent to the end time of output of the first media file playlist.

Figure 2:
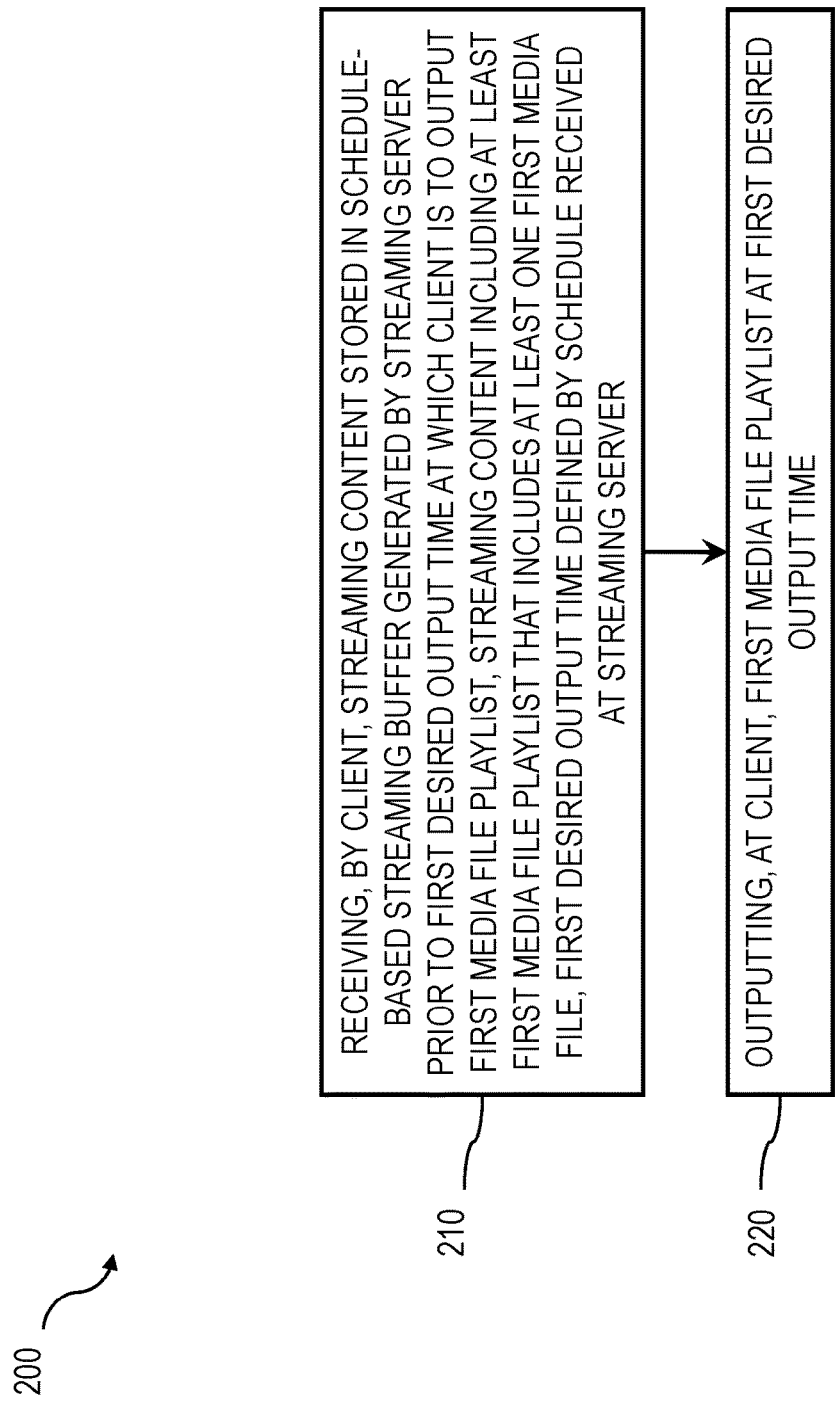
FIG. 2 is a process flow diagram illustrating an exemplary process of schedule-based uninterrupted buffering, streaming, and output.

FIG. 2 is a process flow diagram illustrating an exemplary process 200 of schedule-based uninterrupted buffering, streaming, and output of a media file playlist of media files at a client. By receiving the media file playlist stored in a schedule-based streaming buffer generated prior to a desired output time defined in a schedule, media file playlist output can be achieved at a client without maintaining local copies of the media files, schedule, and configuration files at the client. Thus, client storage limitations can be alleviated, different media formats and codecs can be supported, and synchronous adoptive and/or dynamic bitrate streaming of scheduled media file playlists can be achieved.

At 210, streaming content can be received by a client. The streaming content can be received from a schedule-based streaming buffer. The streaming content can include, for example, at least a first media file playlist stored in the schedule-based streaming buffer. The schedule-based streaming buffer can have been generated, for example, by a streaming server prior to a first desired output time. The first desired output time can be defined in a schedule received by the streaming server. The first media file playlist can include at least one media file received by the streaming server.

At 220, the first media file playlist can be output at the client. The first media file playlist can be output at the first desired output time. For example, audio can be output (e.g., played, played back, audio playback, and/or the like) using an audio output (e.g., speakers, and/or the like), images and videos can be output (e.g., played, displayed, image and/or video playback, and/or the like) using a video output (e.g., a display, and/or the like), and/or multimedia can be output using a combination of audio output and video output. For example, when the streaming content includes at least a second media file playlist including at least one second media file playlist, the second media file playlist can be outputted at the client at the second desired output time subsequent to the first desired output time.

Figure 3:
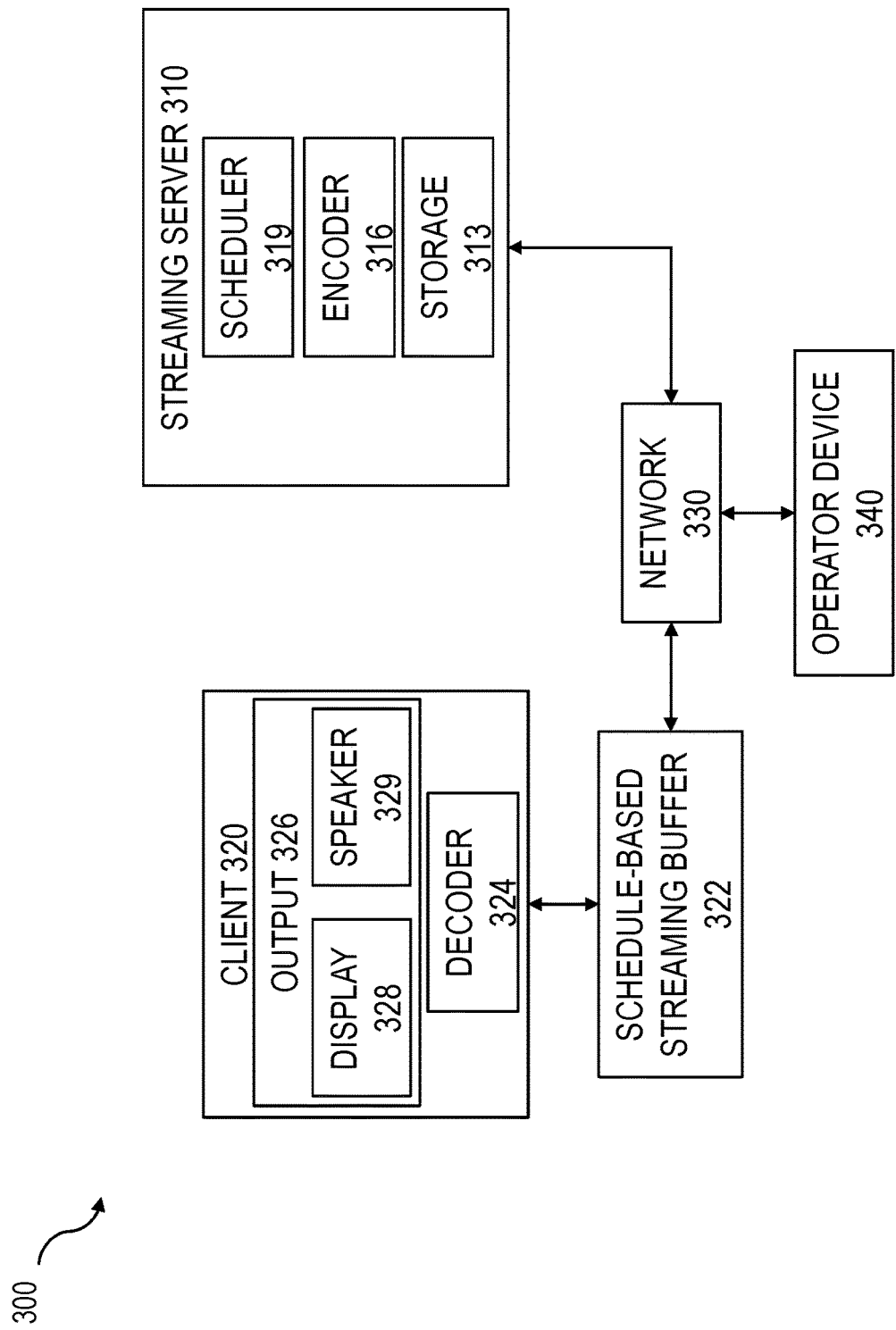
FIG. 3 is a system block diagram illustrating an exemplary simplified operating environment for schedule-based uninterrupted buffering and streaming.

FIG. 3 is a system block diagram illustrating an exemplary simplified operating environment 300 facilitating schedule-based uninterrupted buffering and streaming. Operating environment 300 can include a streaming server 310, a client 320, a network 330, schedule-based streaming buffer 322, and an operator device 340. By facilitating the streaming of a media file playlist stored in schedule-based streaming buffer 322 generated prior to a desired output time defined in a schedule, streaming server 310 and client 320 can achieve media file playlist output at client 320 without maintaining local copies of the media files, schedule, and configuration files at client 320. Thus, client 320 storage limitations can be alleviated, different media formats and codecs can be supported, and synchronous adoptive and/or dynamic bitrate streaming of scheduled media file playlists can be achieved.

Streaming server 310 can generate a schedule-based streaming buffer 322. For example, schedule-based streaming buffer 322 can include a continuous buffer of a stream of media file playlists including media files that can be broadcasted to endpoints at client 320. Streaming server 310 can include storage 313, scheduler 319, and encoder 316. Storage 313 can facilitate storage and retrieval of media files uploaded to streaming server 310. For example, a media file can be uploaded by operator device 340. The media file can be persisted to storage 313. Storage 313 can include one or more storage devices (e.g., hard disk drive, solid state drive, random access memory, and/or the like). Additionally, storage 313 can include a database including the metadata of the media files, such as the media file name, file size, file encoding, file type, a temporal component (e.g., length in time of audio, video, and/or the like), and/or the like.

Figure 4:
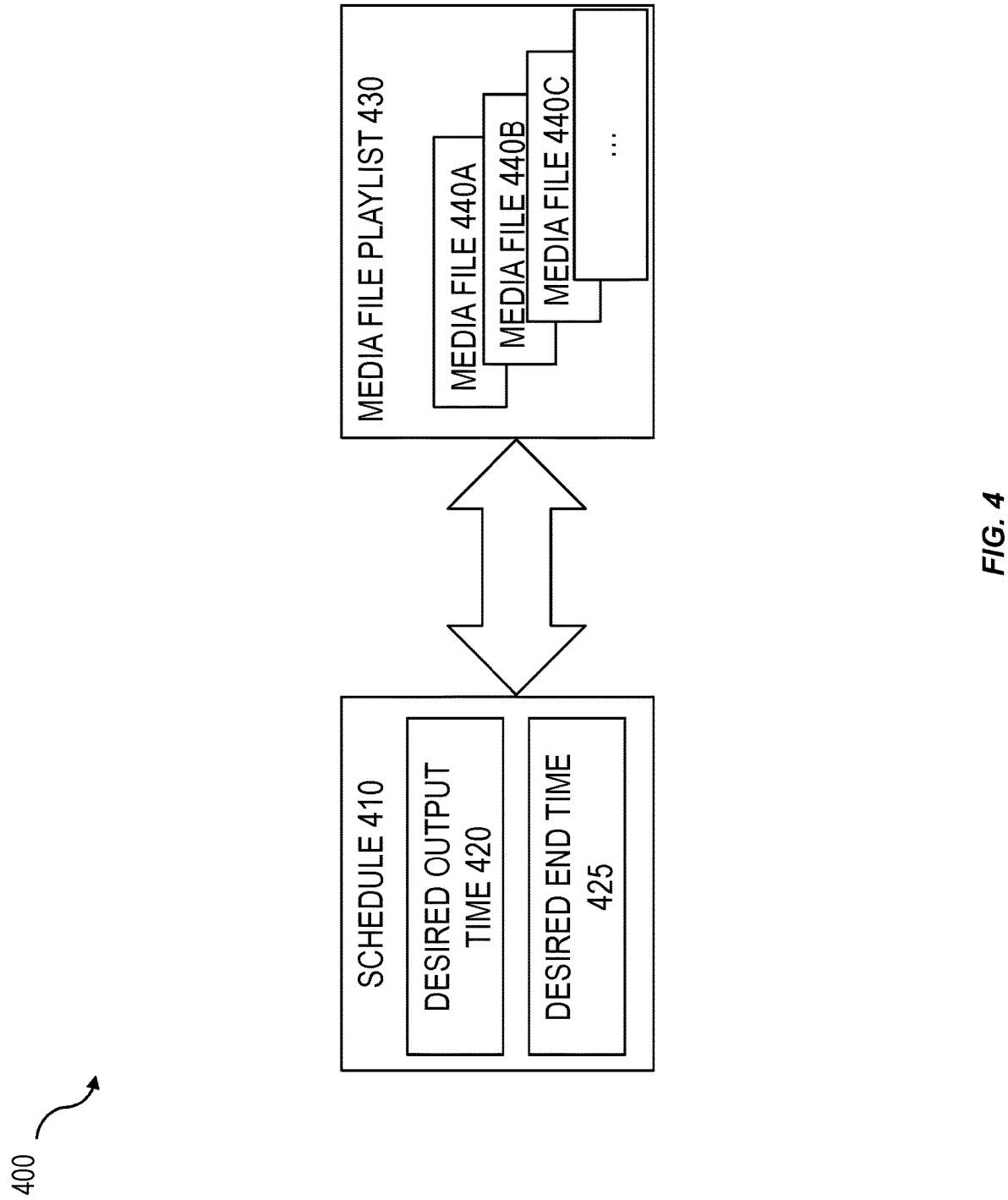
FIG. 4 is a system block diagram illustrating an exemplary embodiment of a media file playlist schedule map.

Scheduler 319 can facilitate media file playlist creation and scheduling. For example, one or more media files can be selected for inclusion in a media file playlist. The media file playlist can be represented using suitable data structures, such as arrays and/or the like, indicating the specified order of media files in the media file playlist. The media file playlist can be associated with a schedule. For example, as illustrated in FIG. 4, a media file playlist-schedule map 400 can include schedule 410 and media file playlist 430. Schedule 410 can include desired output time 420 and desired end time 425. The schedule 410 can be mapped to media file playlist 430 including media files 440A-440C. For example, desired output time 420 can indicate a time when output of the first media file corresponding to the associated media file playlist begins and desired end time 425 can indicate a time when output of the last media file corresponding to the associated media file playlist ends.

Encoder 316 can facilitate the conversion of media files in a media file playlist into a first format different from the original format of the media files. Encoding a media file can facilitate output across a variety of media file outputs. In some cases, converted media files can include compressed versions of the uploaded media files. In some cases, transmitting the encoded media files to client 320 can require less bandwidth than transmitting the media files in an unencoded format. The media files can be encoded using suitable encoding methods including, but not limited to, high efficiency video coding (HEVC), VP9, and/or the like. For example, a media file encoded with HEVC can be provided with a bit rate lower than a video media file that is unencoded. In some embodiments, compression techniques can be used to encode the media files in the media file playlist. For example, the compression techniques can include lossy compression, lossless compression, and/or the like. In some embodiments, the first format can include H.264 advanced video coding, H.265 high efficiency video coding, VP8, VP9, AOmedia video 1, MPEG-2 audio layer III, advanced audio coding, dolby digital audio codec 3. In some embodiments, the encoding can be based on the bandwidth of the streaming network (e.g., network connection between the streaming server and the client). If, for example, a group of clients is designed to stream in x264, then the encoding can be done in x264 format.

In some embodiments, the media files encoded in the first format can be stored in schedule-based streaming buffer 322 for provision to client 320. For example, each media file in the first media file playlist can be partitioned into portions, and each portion can be encoded and stored by the schedule-based streaming buffer 322 in a predetermined order (e.g., if a media file is partitioned into two portions, the first portion can be encoded and transmitted before the second portion is encoded and transmitted, and/or the like). The schedule-based streaming buffer 322 can provide the first media file playlist portions to the client 320 in the predetermined order in which they were stored. For example, an encoded portion of the media file can be included in a bit stream transmitted between streaming server 310 and client 320.

In some embodiments, schedule-based streaming buffer 322 can include a portion of memory reserved for receiving and storing encoded portions of media files corresponding to media file playlists. In some embodiments, the schedule-based streaming buffer can include a mutable memory stream object that can append and pop chunks, in the form of a stream, of the encoded media files of the media file playlist. For example, a media file can be read from the media file playlist and can be divided into multiple chunks of configurable size, format, and/or the like. The size of the chunks can be selected based on factors such as bitrate. For example, a streaming bitrate minimum can be 256 kilobits per second (kbps). The size of the chunks can be adaptive based on factors such as streaming network bandwidth. For example, if the bandwidth supports streaming high resolution, such as 4096 pixels by 2160 pixels, a streaming bitrate of 25 megabits per second (mbps) can be selected. A pointer (e.g., top operation, peep operation, and/or the like) can maintain the timestamp of the media file and point to the chunk which will be sent in response to a request from a client. The chunks which have a timestamp lower than the current timestamp of the pointer can be popped out of the schedule-based streaming buffer and released from memory. For example, the streaming server can include logic to read a media file playlist, fetch media files from the media file playlist, and/or put media streams of the media files inside of the buffer. In some embodiments, schedule-based streaming buffer 322 can be included within the hardware of streaming server 310. In some embodiments, schedule-based streaming buffer 322 can be included within the hardware of client 320. In some embodiments schedule-based streaming buffer 322 can be included in operating environment 300 as hardware separate from the hardware of streaming server 310 and client 320. In some embodiments, there can be multiple instances of the schedule-based streaming buffer that will encode for a group of clients that requested streaming content.

Client 320 can include decoder 324, and output 326. Streaming content, including, for example, at least a first media file playlist, encoded portions of media files of a media file playlist, and/or the like can be received in the encoding and provision order. As encoded portions of media files corresponding to media file playlists are received, they can be decoded by decoder 324 in the order in which the portions were encoded and provisioned. For example, the decoding can be codec specific and can depend on the group and/or type of client. If, for example, a client supports multiple codec, than the decoding can depend upon bandwidth of the streaming network. The portions of media files can be received in a first format. The received portions of the media files encoded in the first format can be decoded into a second format. For example, the second format can facilitate output of received media files in the order in which the media files were received and decoded. The decoded media files can be outputted on output 326. Output 326 can include display 328 and speaker 329. For example, display 328 can facilitate visual output and speaker 329 can facilitate audio output.

Streaming server 310 and client 320 can include a communications component. The communications component can enable wired communication, such as via Ethernet, and can include a transceiver for communicating via a wireless protocol, such as a Bluetooth protocol, cellular protocol, IEEE 802.11b/g/n/ac direct sequence (Wi-Fi) protocol, near field communication (NFC) protocol, a radio frequency identification (RFID) protocol, and/or the like. Wired and/or wireless communication via the communication system can be enabled via any communication protocol, such as transmission control protocol/internet protocol (TCP/IP). Wireless cellular connectivity can include 4G, 4G LTE, 5G, or any mobile communication standard. Additionally, communication can include serial communication, such as via RS-485, RS-422, current loop, and/or the like. The communications component can facilitate communication between streaming server 310 and client 320 directly or over network 320. Network 330 can include the Internet, a wireless wide area network, a local area network, a wide area network, a controller area network, a wired network, or the like.

Operator device 340 can include a desktop, laptop, tablet, cell phone, and/or the like. Operator device 340 can be configured to receive input characterizing media files. And operator device 340 can be configured to receive input specifying a media file playlist and associating media files with the specified media file playlist. Operator device 340 can be configured to receive input characterizing a schedule, for example, specifying a desired output time and/or a desired end time of output of a specified media file playlist and corresponding media files. Operator device 340 can be configured to receive input indicating a modification to a media file playlist (e.g., adding or removing media files, and/or the like), a schedule (e.g., associating a different desired output time to a media file playlist, and/or the like), and/or other modifications. Operator device 340 can be configured to communicate the received input characterizing media files, specifying a media file playlist and associating media files with the specified media file playlist, specifying a desired output time, indicating a modification to the media file playlist, and/or the like to streaming server 310 over network 330.

Figure 5:
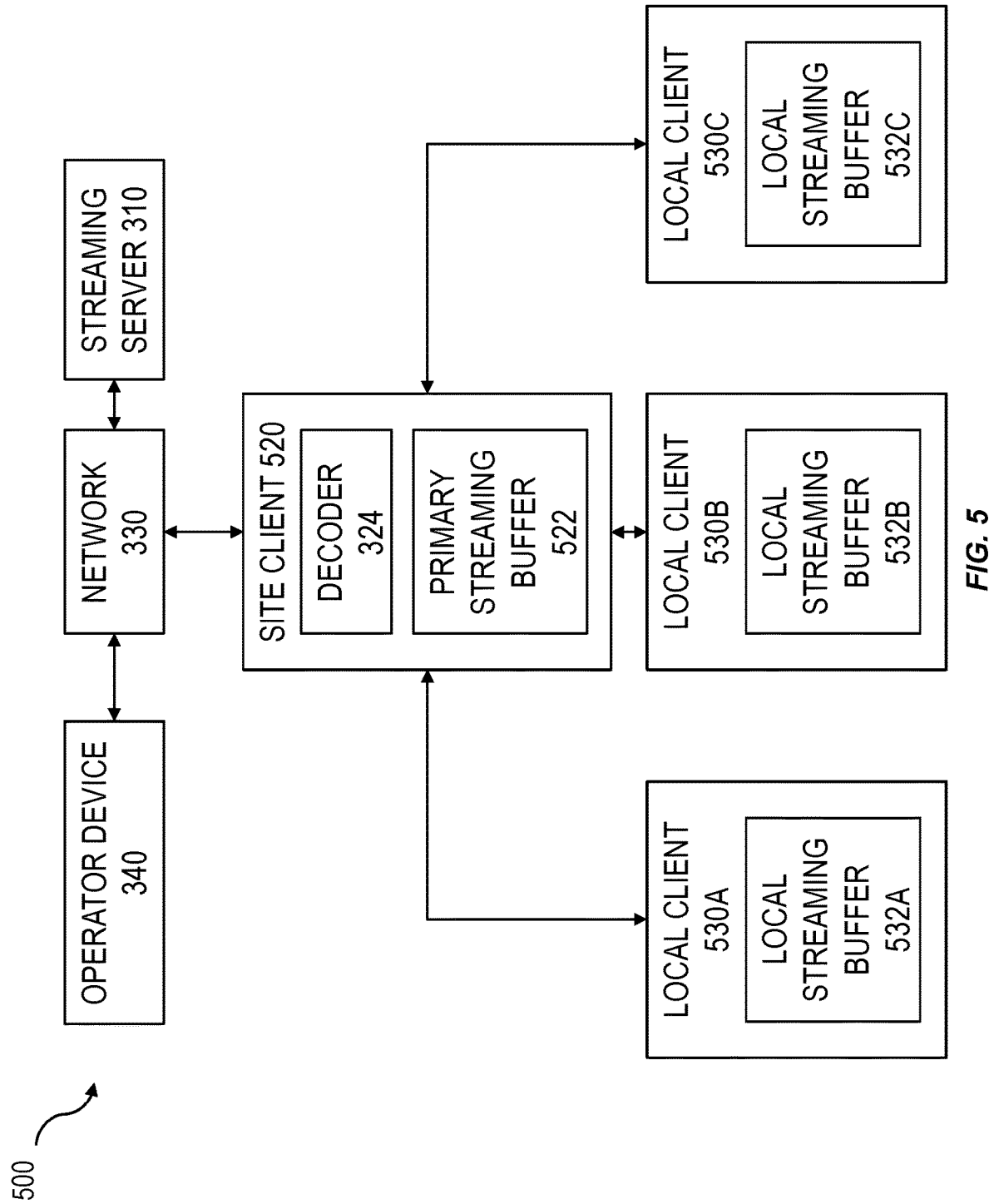
FIG. 5 is a system block diagram illustrating an exemplary simplified operating environment for schedule-based uninterrupted buffering and streaming.

FIG. 5 is a system block diagram illustrating an exemplary simplified operating environment 500 for schedule-based uninterrupted buffering and streaming. Operating environment 500 can include streaming server 310, network 330, and operator device 340 described above with reference to FIG. 3. Operating environment 500 can include site client 520 including primary schedule-based streaming buffer 522. For example, the first media file playlist can be added to primary schedule-based streaming buffer 522 by streaming server 310.

It can be appreciated that primary schedule-based streaming buffer 522 has been illustrated within the hardware of site client 520, however other configurations are contemplated. For example, in some embodiments, primary schedule-based streaming buffer 522 can be included within the hardware of streaming server 310. In some embodiments, primary schedule-based streaming buffer 522 can be included within the hardware of site client 520, as illustrated in FIG. 5. In some embodiments primary schedule-based streaming buffer 522 can be included in operating environment 500 as hardware separate from the hardware of streaming server 310 and client 320, as illustrated in FIG. 3. Primary schedule-based streaming buffer 522 can be generated by streaming server 310 prior to a desired output time defined in a schedule and can store a media file playlist prior to the desired output time defined in the schedule.

As described above, the encoded portions of media files can be decoded by decoder 324 into a second format and transmitted to local schedule-based streaming buffers at local clients 530A-530C. It can be appreciated that in the embodiment illustrated in FIG. 5, local schedule-based streaming buffers 532A-532C are included within the hardware of local clients 530A-530C, however other embodiments are contemplated. In some embodiments, local streaming buffer 532A-532C can include an allocated data storage space at local client 530A-530C. In some embodiments, site client 520 can be in communication with local client 530A-530C. Local streaming buffer 532A-532C can receive the decoded portions of media files. The decoded portions of media files received in local streaming buffer 532A-532C can be output by local client 530A-530C.

Figure 6:
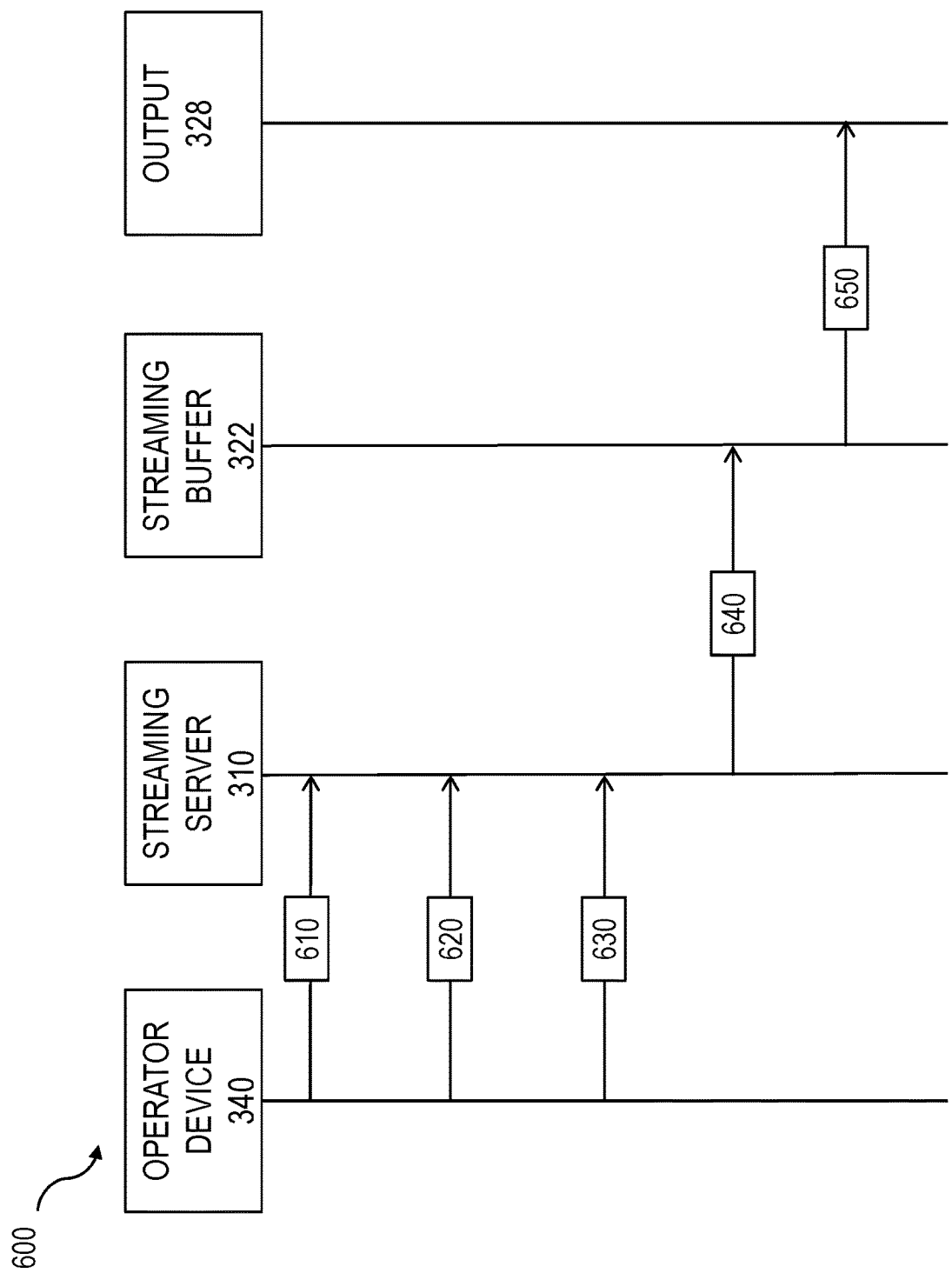
FIG. 6 is a data flow diagram illustrating exemplary data communication between components of the operating environment illustrated in FIG. 3.

FIG. 6 is a data flow diagram illustrating exemplary data communication 600 between components of the operating environment illustrated in FIG. 3. By providing media file playlists to a client using schedule-based streaming buffers generated prior to a desired output time defined by a schedule, media file playlist output can be achieved without maintaining local copies of the media files, schedule, and configuration files at the client. Thus, client storage limitations can be alleviated, different media formats and codecs can be supported, and synchronous adoptive and/or dynamic bitrate streaming of scheduled media file playlists can be achieved.

At 610 media files can be received by streaming server 310. For example, media files M1, M2, M3, M4, M5, M6, and M7 can be uploaded to streaming server 310 using operator device 340. At 620, operator device 340 can facilitate creation by streaming server 310 of one or more media file playlists and include one or more media file in each of the created media file playlists. For example, operator device 340 can facilitate creation of Media File Playlist A and Media File Playlist B by streaming server 310. Media files M1, M2, M3, and M4 can be included in Media File Playlist A (e.g., Media File Playlist A={M1, M2, M3, M4})

and media files M5, M6, and M7 can be included in Media File Playlist B (e.g., Media File Playlist B={M5, M6, M7}).

At 630, streaming server 310 can receive a schedule defining a desired output time for Media File Playlist A and Media File Playlist B. For example, operator device 340 can facilitate receiving from a user input of a schedule defining a desired output time and a desired end time for each media file playlist. Following the above example, the schedule can map Media File Playlist A to a desired output time of 9:00 AM UTC and a desired end time of 9:30 AM UTC and map Media File Playlist B to a desired output time of 9:30 AM UTC and a desired end time of 9:45 AM UTC. At a time just before 9:00 AM UTC, streaming server 310 can generate schedule-based streaming buffer 322 for storing the scheduled stream of media files in Media File Playlist A. For example, in some embodiments the media files in Media File Playlist A can be can be divided into chunks (e.g., portions) for encoding and provision.

At 640, Media File Playlist A can be stored by schedule-based streaming buffer 322. For example, each chunk of M1 can be encoded by encoder 316 and transmitted over network 330 to schedule-based streaming buffer 322. The encoded chunks of M1 can be received in schedule-based streaming buffer 322 and schedule-based streaming buffer 322, including, for example, the first chunk of M1, can be provided to client 320. The encoded chunks can be decoded by decoder 324. At 650, the decoded chunks of M1 can be output at client 320 at the scheduled desired output time for Media File Playlist A, for example, visual media can be output on display 328, audio media can be output through speaker 329, and/or the like.

When the last chunk of M1 is encoded and transmitted to schedule-based streaming buffer 322 for storage and schedule-based streaming buffer 322, including, for example, the last chunk of M1, is provided to client 320, the first chunk of M2 can be encoded and transmitted to schedule-based streaming buffer 322. Schedule-based streaming buffer 322, including, for example, the first chunk of M2, can be provided to client 320. Similarly, the encoded chunks of M2 can be received by client 322 and decoded by decoder 324. The decoded chunks of M2 can be output at the client, for example, the first encoded chunk of M2 can be output following the output of the last decoded chunk of M1. Likewise, each media file in Media File Playlist A can be segmented into chunks and each chunk can be encoded by encoder 316, transmitted over network 330 to schedule-based streaming buffer 322 for storage. Subsequently, the stored chunks in schedule-based streaming buffer 322 can be provided to client 320, decoded by decoder 324, and output at client 320.

When the last chunk of the last media file in Media File Playlist A is encoded and stored in schedule-based streaming buffer 322 (e.g., the last chunk of M4), the media files in Media File Playlist B can be divided into chunks for encoding and provision. Each chunk of M5 can be encoded by encoder 316 and transmitted over network 330 to schedule-based streaming buffer 322. The encoded chunks of M5 can be stored in schedule-based streaming buffer 322 and schedule-based streaming buffer 322, including, for example, each subsequent iteration of received and stored chunks of M5, can be provided to client 320. The encoded chunks of M5 can be decoded by decoder 324. The decoded chunks of M5 can be output at client 320 at the scheduled desired output time for Media File Playlist B. Likewise, each media file in Media File Playlist B can be segmented into chunks and each chunk can be encoded by encoder 316, transmitted over network 330 to schedule-based streaming buffer 322 for storage. Subsequently, the stored chunks in schedule-based streaming buffer 322 can be provided to client 320, decoded by decoder 324, and output at client 320.

The client can continue to stream from the same streaming endpoint, such as streaming server 310, and load on client 320 can be reduced because media files can be played directly over network 330 according to the media file playlist schedule rather than downloading the media files, schedules, and/or configuration files and storing them locally. And streaming server 310 resources can be scalable (e.g., by adding more streaming servers 310, adding more processors to streaming server 310, and/or the like), allowing the media files to be converted and the streaming buffer to be prepared in real time. And updates to the schedule can be adopted in real time, since any changes to the schedule can result in changes to the selection of media files transmitted by the streaming server. And streaming the media files can allow for adopting network bandwidth and controlling the bitrate of the media files stream.

Although a few variations have been described in detail above, other modifications or additions are possible. For example, in some embodiments, the client can include a fuel dispenser. In some embodiments, the primary schedule-based streaming buffer can be maintained for a fueling site. The complete fueling site can stream from the primary schedule-based streaming buffer. For example, each fuel dispenser can receive the stream in a local buffer from the fuel site primary schedule-based streaming buffer. Each fuel dispenser can use a buffer maintained locally at the fuel dispenser to output the media files. In some embodiments, the media files can be converted to a particular format in real time. The conversion can occur, for example, in a stream by stream basis, in a chunk by chunk basis, and/or the like. In some embodiments, bandwidth overutilization can be mitigated, for example, by encoding the stream in a bitrate lower than a bitrate supported by the network. In some embodiments, network interruptions can be alleviated by maintaining a backup of media files, schedules, and configuration files at a site client.

The subject matter described herein provides many technical advantages. For example, some embodiments of the current subject matter can allow changes to a media file playlist schedule to be reflected in real time. And clients can stream media files in a scheduled media file playlist without maintaining local copies of the media files, schedule settings, configuration files, and/or the like. Also, client memory limitations can be avoided. In addition, synchronous streaming of scheduled media file playlists between multiple clients can be achieved. Further, media formats and codecs for each individual client can be provided. Furthermore, adoptive and/dynamic streaming based on network bandwidth can be achieved.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving, by a streaming server, at least one first media file;
   creating, by the streaming server, a first media file playlist including the at least one first media file;
   receiving, by the streaming server, a schedule defining a first desired output time at which a client is to output the first media file playlist;
   associating, by the streaming server, the first media file playlist with the first desired output time;
   generating, by the streaming server, a schedule-based streaming buffer that stores the first media file playlist prior to the first desired output time; and
   providing, by the streaming server, the schedule-based streaming buffer to the client such that the client outputs the first media file playlist at the first desired output time.

2. The method of claim 1, further comprising:
   receiving, by the streaming server, at least one second media file;
   creating, by the streaming server, a second media file playlist including the at least one second media file; and
   inserting, by the streaming server, the second media file playlist into a location of the schedule-based streaming buffer following the first media file playlist prior to a second desired output time at which the client is to output the second playlist subsequent to the first desired output time such that the client outputs the second media file playlist at the second desired output time;
   wherein the schedule defines the first desired output time and the second desired output time.

3. The method of claim 1, wherein the schedule-based streaming buffer includes an allocated data storage space, the allocated data storage space including the added first media file playlist encoded in a first format.

4. The method of claim 1, wherein the schedule-based streaming buffer is created in response to an occurrence of the first desired output time.

5. The method of claim 1, wherein adding the first media file playlist to the schedule-based streaming buffer includes encoding the first media file playlist into a first format, the encoding further comprising:
   determining, based on a bandwidth of a network connection to the client, a first bit rate; and determining, based on a collection of playback formats available to the client, a first codec;
wherein encoding the first media file playlist into the first format includes using the first bit rate and the first codec.

6. The method of claim 5, wherein the first codec includes H.264 advanced video coding, H.265 high efficiency video coding, VP8, VP9, AOmedia video 1, MPEG-2 audio layer III, advanced audio coding, dolby digital audio codec 3.

7. The method of claim 1, wherein the client includes a fuel dispenser.

8. A method comprising:
receiving, by a client, streaming content stored in a schedule-based streaming buffer generated by a streaming server prior to a first desired output time at which the client is to output a first media file playlist, the streaming content including at least the first media file playlist that includes at least one first media file, the first desired output time defined by a schedule received at the streaming server and associated with the first media file playlist by the streaming server; and
outputting, at the client, the first media file playlist at the first desired output time.

9. The method of claim 8, wherein the streaming content further includes at least a second media file playlist including at least one second media file, the second media file playlist inserted into a location of the schedule-based streaming buffer following the first playlist prior to a second desired output time at which the client is to output the second media file playlist subsequent to the first desired output time, the second desired output time defined by the schedule received at the streaming server; and
outputting, at the client, the second media file playlist at the second desired output time.

10. The method of claim 8, wherein the schedule-based streaming buffer includes an allocated data storage space, the allocated data storage space including the first media file playlist encoded in a first format.

11. The method of claim 8, wherein outputting the second media file playlist includes decoding the first media file playlist from a first format into a second format, the decoding further comprising:
decoding, using a first codec, the first media file playlist into the second format.

12. The method of claim 11, wherein the first codec includes H.264 advanced video coding, H.265 high efficiency video coding, VP8, VP9, AOmedia video 1, MPEG-2 audio layer III, advanced audio coding, dolby digital audio codec 3.

13. The method of claim 8, wherein the client includes a fuel dispenser.

14. The method of claim 8, wherein the outputting includes one or more of playing audio from an audio output and playing video from a video output.

15. A system comprising:
a streaming server configured to:
receive at least one first media file;
create a first media file playlist, the first media file playlist including the at least one first media file;
receive a schedule defining a first desired output time at which a client is to output the first media file playlist;
associate the first media file playlist with the first desired output time;
generate a schedule-based streaming buffer that stores the first media file playlist prior to the first desired output time; and
provide the schedule-based streaming buffer to the client such that the client outputs the first media file playlist at the first desired output time; and
the client configured to:
receive streaming content stored in the schedule-based streaming buffer prior to the first desired output time, the streaming content including at least the first media file playlist that includes the at least one media file; and
output the first media file playlist at the first desired output time.

16. The system of claim 15, wherein the streaming server is further configured to:
receive at least one second media file;
create a second media file playlist, the second media file playlist including the at least one second media file;
insert the second media file playlist into a location of the schedule-based streaming buffer following the first media file playlist prior to a second desired output time at which the client is to output the second playlist subsequent to the first desired output time such that the client outputs the second media file playlist at the second desired output time;
wherein the schedule defines the first desired output time and the second desired output time;
wherein the streaming content further includes at least the second media file playlist including the at least one second media file; and
wherein the client is further configured to:
output the second media file playlist at the second desired output time.

17. The system of claim 15, wherein the streaming server is further configured to:
determine, based on a bandwidth of a network connection to the client, a first bit rate; and
determine, based on a collection of playback formats available to the client, a first codec;
wherein the first media file playlist is encoded into a first format using the first bit rate and the first codec; and
wherein the client is further configured to:
decode, using the first codec, the encoded first media file playlist into a second format.

18. The system of claim 15, wherein the schedule-based streaming buffer includes an allocated data storage space, the allocated data storage space including the first media file playlist; and
wherein the schedule-based streaming buffer is created in response to an occurrence of the first desired output time.

19. The system of claim 15, wherein the client includes a fuel dispenser.

20. The system of claim 15, wherein the client further comprises one or more of an audio output device and a video output device;
wherein the audio output device is configured to output audio included in the first media file playlist; and
wherein the video output device is configured to output video included in the first media file playlist.

* * * * *